No. 863,535. PATENTED AUG. 13, 1907.
J. HIPPISLEY.
RUBBER TIRE PROTECTOR.
APPLICATION FILED MAR. 15, 1906.
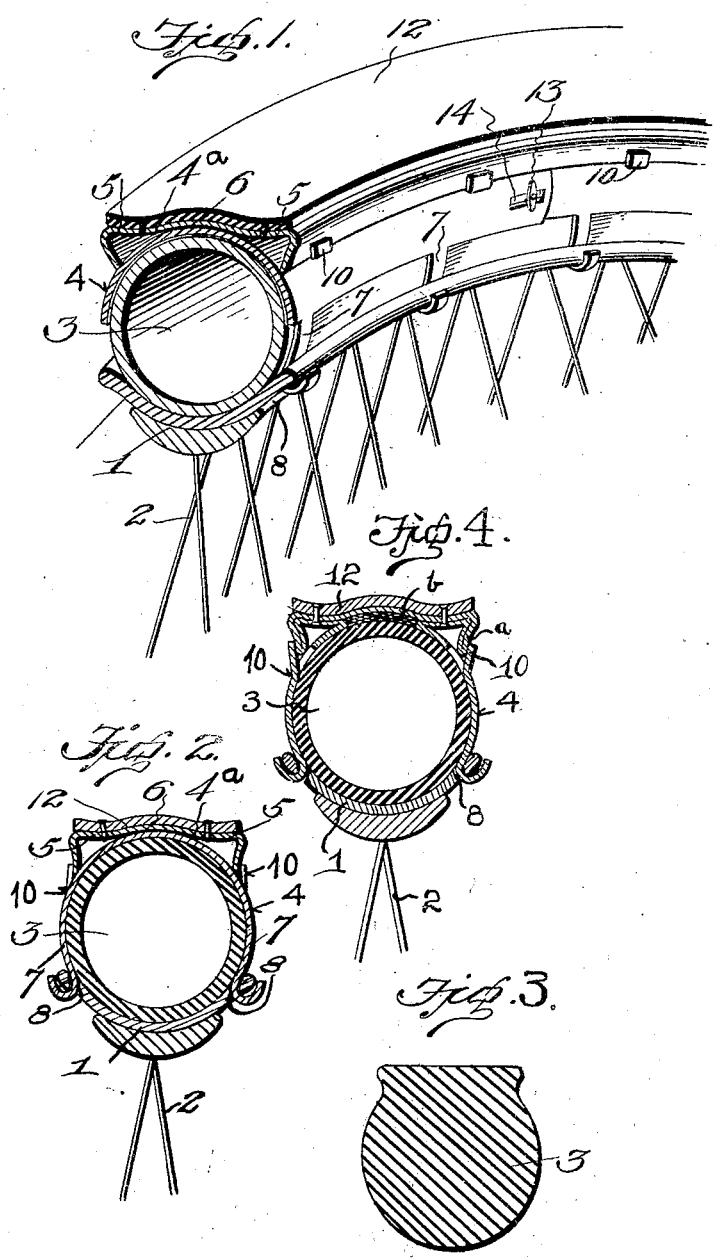

UNITED STATES PATENT OFFICE.

JAMES HIPPISLEY, OF BOSTON, MASSACHUSETTS, ASSIGNOR OF FORTY-FIVE ONE HUNDREDTHS TO ALBERT E. PENNEY, OF CARBONEAR, NEWFOUNDLAND.

RUBBER-TIRE PROTECTOR.

No. 863,535.　　　　Specification of Letters Patent.　　　　Patented Aug. 13, 1907.

Application filed March 15, 1906. Serial No. 306,286.

*To all whom it may concern:*

Be it known that I, JAMES HIPPISLEY, a subject of the King of Great Britain, residing at Boston, in the county of Suffolk and State of Massachusetts, have invented certain new and useful Improvements in Rubber-Tire Protectors; and I do declare the following to be a full, clear, and exact description of the invention, such as will enable others skilled in the art to which appertains to make and use the same.

This invention relates to protectors for rubber tires, such as are used on cycles, automobiles and other vehicles; and one of the principal objects of the same is to provide means to prevent the tire from being punctured and also to prevent skidding or slipping of the tire on the surface of the ground.

Another object is to provide a device of this character which shall be simple in construction, efficient in operation and which can be easily attached to the tire and rim of a wheel.

These and other objects are attained by means of the construction illustrated in the accompanying drawings, in which:

Figure 1 is a perspective view of a section of a tire rim and my protector shown thereon; Fig. 2 is a transverse sectional view through the tire, the protector, and the arms for holding the protector in position upon the tire; Fig. 3 is a sectional view of a tire having a flat bearing surface upon which my protector may be secured; and Fig. 4 is a sectional view of a modified form of protector.

Referring to the drawings for a more particular description of my invention, 1 designates the rim, which may be of the usual or any preferred construction; and 2 are the spokes. The tire 3 may be round and of the pneumatic type or may be solid and of the form in cross section shown in Fig. 3.

The protector consists of a sheath 4 constructed of a sheet metal strip bent into substantially semi-circular form in cross section to bear upon the tire, and a bearing plate or tread 4ª, which may be of various contours in cross section, but which preferably is provided with outwardly extending edges 5 and a slightly convex intermediate portion 6, the purpose of which is to give an edge bearing upon the ground when the central convex portion has become depressed by the weight upon it, thus preventing skidding or slipping of the wheel upon the ground.

The arms 7 extending from the lower edge of the sheath are passed through slots or apertures 8 in the rim of the wheel and are then bent upward or curved to retain the sheath in place; the arms, however, being permitted to move freely within the apertures in the rim.

At the sides of the sheath lugs 10 are cut from the body of the metal and extend above the lower edges of the tread. The purpose of these lugs is to give greater strength and stability at the edges of the tread and to secure a better hold upon the surface of the ground. A tread surface or strip 12 is secured to the tread proper by any suitable means. This tread strip may be made of rubber, leather or other suitable material and may be secured in any desirable manner to the tread.

In the modified form shown in Fig. 4, the sheath and tread are formed in a single piece, the downwardly bent edge $a$ of the tread being formed of two thicknesses of metal, and a piece of felt or other material, $b$, is interposed between the tread and the tire to prevent dirt, gravel or other foreign substances from interfering with the operation of the device.

From the foregoing, it will be obvious that my tire protector serves to prevent the puncturing of tires; obviates the accidental displacement of the tire from the rim; and gives a better hold upon the ground to prevent skidding or slipping.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A protector for vehicle tires comprising a sheath provided with rim-engaging arms and with lateral lugs, and a tread having its margins arranged to engage the lugs.

2. A protector for vehicle tires comprising a sheath provided with hooked rim-engaging arms and with lateral obliquely-disposed lugs, and a tread having its margins arranged to engage the lugs.

3. A protector for vehicle tires comprising a sheath provided with hooked rim-engaging arms and with lateral obliquely-disposed lugs, and a tread having outwardly-extending margins arranged to engage the lugs.

4. A protector for vehicle tires comprising a sheath and a tread constructed of a single piece of metal, the sheath being provided with hooked rim-engaging arms and with lateral lugs to be engaged by the margins of the tread.

In testimony whereof I have hereunto set my hand in presence of two subscribing witnesses.

JAMES HIPPISLEY.

Witnesses:
　EDNA M. CROSSLEY,
　W. HOLT APGAR.